United States Patent

Vasconi

[11] Patent Number: 5,876,005
[45] Date of Patent: Mar. 2, 1999

[54] CAMERA AND SPOTTING SCOPE MOUNTING DEVICE FOR ALL-TERRAIN VEHICLES

[76] Inventor: William L. Vasconi, 6565 W. Atwood Ave., Las Vegas, Nev. 89108

[21] Appl. No.: 898,363

[22] Filed: Jul. 22, 1997

[51] Int. Cl.$^6$ .................................................. E04G 3/00
[52] U.S. Cl. ...................................... 248/276.1; 396/428
[58] Field of Search .............................. 248/125.1, 183.2, 248/185.1, 276.1, 278.1, 284.1, 288.31; 396/419, 428

[56] References Cited

U.S. PATENT DOCUMENTS

| | | | |
|---|---|---|---|
| 1,460,697 | 7/1923 | Bendlin | 248/276.1 |
| 2,524,172 | 10/1950 | Miler, Jr. et al. | 248/185.1 |
| 3,096,962 | 7/1963 | Meijs | 248/276.1 |
| 3,227,409 | 1/1966 | Pagliuso | 248/185.1 |
| 5,078,355 | 1/1992 | Fujimoto et al. | 248/185.1 |
| 5,664,750 | 9/1997 | Cohen | 248/288.31 |

*Primary Examiner*—Leslie A. Braun
*Assistant Examiner*—Robert Lipcsik
*Attorney, Agent, or Firm*—Philip D. Junkins

[57] ABSTRACT

An extendable device mountable on a cargo rack of an all-terrain vehicle for supporting a camera or spotting scope and adjustable to secure the camera or spotting scope in a raised operative position above the rack or in a collapsed non-operative stored position proximate the rack. The device includes a base mounting plate for removable attachment of the device to a cargo rack of an all-terrain vehicle, a lower support arm having its lower end pivotally and rotatably connected by a ball joint to the base plate, an upper support arm having its lower end pivotally and rotatably connected to the upper end of the lower support arm by a ball joint, and a top mounting plate pivotally attached to the upper end of the upper support arm by a pivot joint for attachment to and support of a camera or spotting scope. Thumb screws are provided at each of the ball joints and at the pivot joint for loosening such joints to permit movement of the support arms and top mounting plate to extend the device to an operative position or to permit movement of the support arms downwardly to a collapsed non-operative position proximate the base plate or for tightening the ball joints and pivotal joint to hold the support arms and top mounting plate in the operative position or to hold the support arms and top mounting plate in the non-operative position.

8 Claims, 2 Drawing Sheets

CAMERA AND SPOTTING SCOPE MOUNTING DEVICE FOR ALL-TERRAIN VEHICLES

FIELD OF THE INVENTION

The present invention relates in general to all-terrain vehicles used by hunters, sportspersons and naturalists. More particularly, the invention relates to adjustable support devices for cameras and spotting scopes including means for mounting such distance observation and recording devices on all-terrain vehicles.

BACKGROUND OF THE INVENTION

Big game hunters and other outdoor sportspersons and naturalists frequently use all-terrain vehicles (ATVs) for their personal transport and the transport of their camping and sports gear to more or less inaccessible cross-terrain locations. Such vehicles are generally of small jeep-type, four-wheel drive machines which are usually outfitted with front and rear cargo racks for camping gear and supplies and other support devices for gun and bow cases, fishing gear, etc. Hunters, outdoor sportspersons and naturalists usually carry with them cameras, binoculars and spotting scopes and, in association therewith, tripods and bipods for steadying support of such distance viewing and film recording devices. Frequently, the use of tripods and bipods for the support of cameras and spotting scopes is inconvenient and the rapid assembly of cameras and scopes to such support devices, to record and/or observe distant hunting prey and/or other natural events and scenes, may not be possible.

It is a principal object of the present invention to provide an adjustable support device for a camera or spotting scope including means for mounting such support device on an all-terrain vehicle.

It is a further object of the invention to provide an adjustable and collapsible arm support device for a camera or spotting scope including a base plate for mounting such support device on the front cargo rack of an all-terrain vehicle.

Other objects and advantages of the present invention will be apparent from the following summary and detailed descriptions of the invention, taken together with the accompanying drawing figures.

SUMMARY OF THE INVENTION

The present invention relates to all-terrain vehicles used by hunters, sportspersons and naturalists and specifically to an adjustable and collapsible support device for cameras and spotting scopes including means for mounting such device on the front cargo rack of all-terrain vehicles (ATVs). The front cargo rack of substantially all ATVs comprises a gridwork of pipes located over the front hood of such vehicles whereby camping gear and supplies can be supported and lashed to the rack for transport over rough terrain to remote locations. In accordance with the invention such cargo rack provides a platform for the mounting of the unique adjustable and collapsible support device of the invention for the operative upward extending support and non-operative storage positioning of a camera or spotting scope.

The adjustable and collapsible support device of the invention includes a base mounting plate and an upwardly extendable sequence of two interconnected support arms. The lower support arm is pivotally and rotatably mounted at its lower end to the base mounting plate and the upper support arm bears at its upper end, in double pivoted fashion, a top mounting plate with screw means for attachment and support of either a camera or spotting scope to such adjustable support device. The base mounting plate of the support device also bears a hinged support bracket for holding the pivotally closed support arms when the adjustable support device is collapsed to its non-operative position on the base plate and for holding the camera or spotting scope (when the support device is collapsed) in a fixed non-operative position. The lower support arm of the device also bears a holding bracket for receiving and holding the upper end of the upper support arm and for maintaining the top mounting plate, with its attached camera or spotting scope, in a protected non-operative collapsed position and out of a view-blocking position when the ATV is being driven. Thus, the unique camera or spotting scope support device of the invention, when mounted to the front cargo rack of an ATV, can be readily positioned in its camera ready or spotting scope operative position when desired by the ATV operator or can be returned to a camera or scope protected non-operative position when the ATV is being driven.

BRIEF DESCRIPTION OF THE DRAWING FIGURES

The present invention, as described in greater detail hereinafter, is presented via a non-limitative embodiment and with reference to the attached drawing figures wherein.

DETAILED DESCRIPTION OF THE INVENTION

Figure 1:
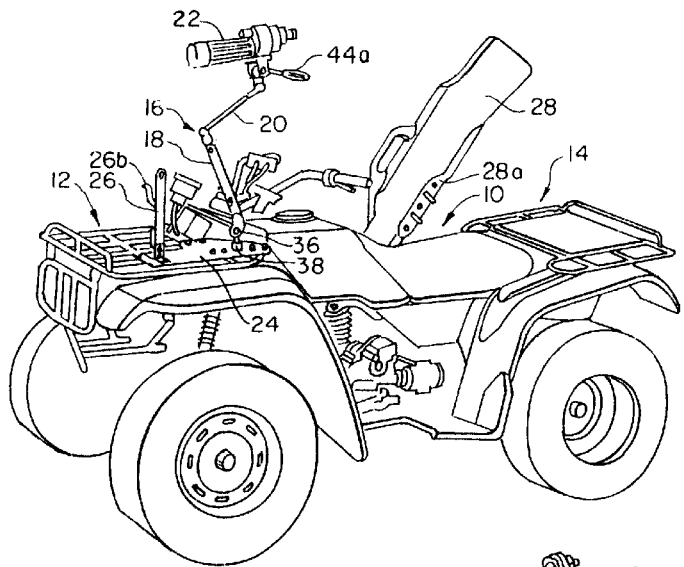
FIG. 1 is a side perspective view of an all-terrain vehicle (ATV) having front end and rear end cargo racks with a camera or spotting scope mounting device, including a spotting scope, mounted on the front end cargo rack in accordance with the present invention.

As previously indicated, the present invention relates to all-terrain vehicles used by hunters, sportspersons and naturalists and specifically to an adjustable and collapsible support device for cameras and spotting scopes including means for mounting such device on the front cargo rack of all-terrain vehicles. Referring initially to FIG. 1 of the drawings, there is illustrated in a side perspective view a four-wheel, all-terrain vehicle (ATV) 10 of known type. As shown, the ATV has a front end cargo rack 12 and a rear end cargo rack 14. Mounted to the front end cargo rack 12 is the camera or spotting scope mounting device 16 of the invention and, as illustrated, the mounting device includes a lower support arm 18 and a pivotally interconnected upper support arm 20 with the upper support arm bearing at its upper end a typical spotting scope 22.

The camera or scope mounting device 16 of the invention is affixed to the front end cargo rack 12 by a lower (base) mounting plate 24. The base mounting plate 24 also bears, in upwardly extending fashion, a hinged bracket 26 which provides separate means for maintaining the scope 22 (or camera) and for maintaining the support arms 18 and 20 against movement when in their collapsed non-operative positions. In FIG. 1 the mounting device 16 and spotting scope 22 are shown in a typical upward operative position. Also shown in the figure is a gun case 28 supported on a bracket 28a positioned on the right side of the ATV.

Figure 2:
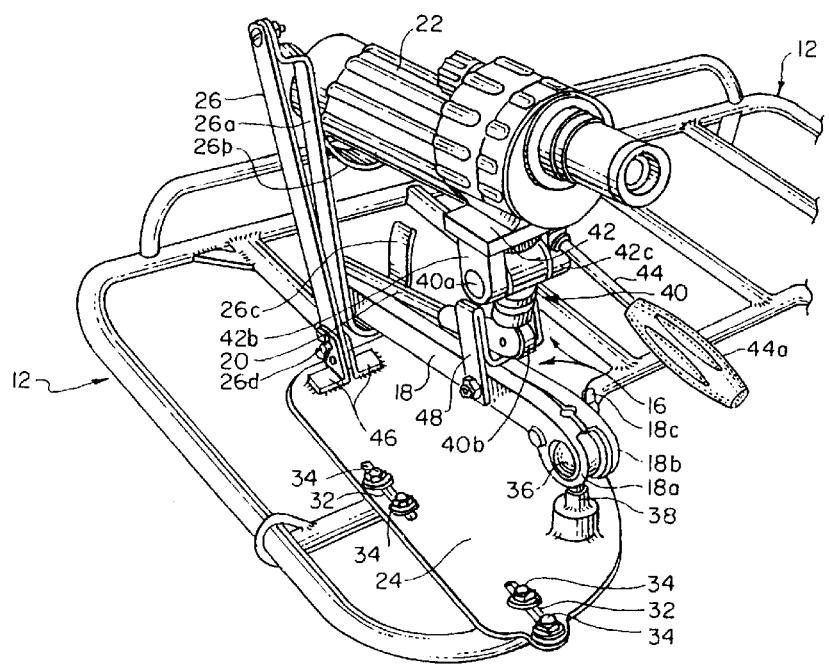
FIG. 2 is an enlarged perspective view of the camera or spotting scope mounting device of the invention with the mounting device, including a spotting scope, shown in its collapsed and non-operative position on the front end cargo rack of an ATV.

Referring now to FIG. 2, there is shown in an enlarged perspective view the camera or spotting scope mounting device 16 of the invention. As illustrated, the mounting device 16, including a spotting scope 22, is shown in its collapsed and non-operative position on the front end cargo rack 12 of an ATV with its lower mounting plate 24 affixed to the cargo rack. The cargo rack 12 is comprised of a gridwork of pipes whereby camping gear and supplies can be supported on and lashed to the rack. When the cargo rack 12 is utilized as a platform for the mounting of the adjustable and collapsible camera or spotting scope mounting device 16 of the invention, the mounting plate 24 of such device is removably affixed to the cargo rack gridwork. Thus, a series of "U" bolts 30 are applied from under the pipe gridwork so that each "U" bolt surrounds a gridwork pipe and extends upwardly through a bolt adjustment slot 32 in the mounting plate 24. Drawing FIGS. 3 and 4 should be viewed for a preferred configuration of the mounting plate 24 and a suitable arrangement of the series of "U" bolts 30 used for affixing such plate to the cargo rack gridwork. The threaded ends of the "U" bolts 30, projecting through the mounting plate 24, may be maintained in their pipe gripping position via standard or acorn nuts 34.

Figure 3:
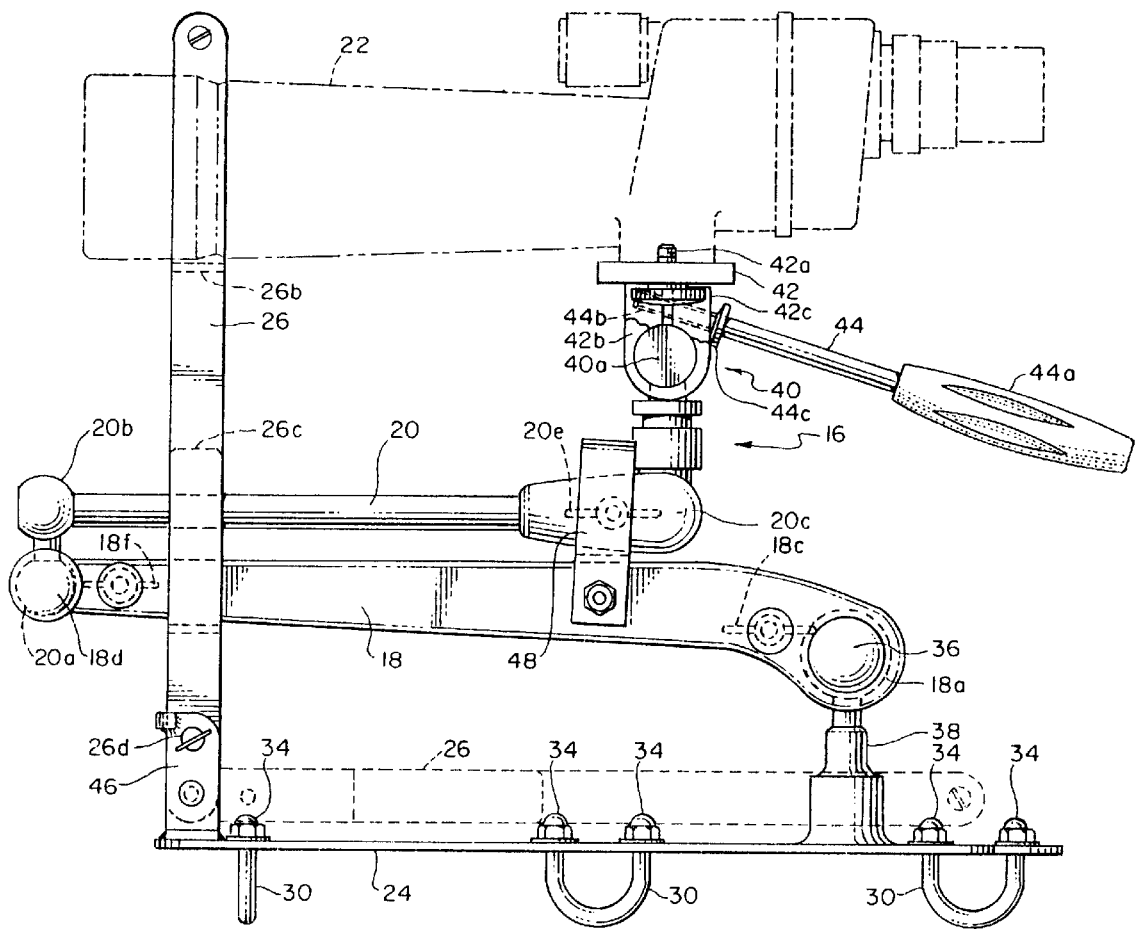
FIG. 3 is an enlarged side elevation view of the camera or spottin scope mounting device of the invention shown in its collapsed and non-operative position with respect to the cargo rack mounting plate of the device.
Figure 4:
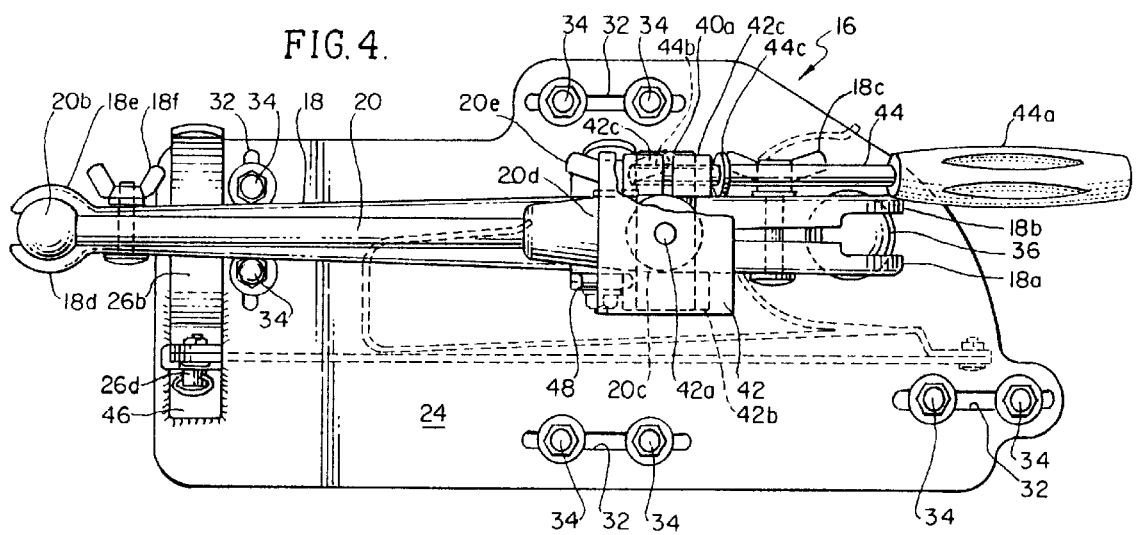
FIG. 4 is a top view of the camera or spotting scope mounting device of FIG. 3.

As previously indicated, the camera or spotting scope mounting device 16 of the invention is comprised principally of a lower support arm 18 and a pivotally interconnected upper arm 20. The lower end of the lower arm 18 is comprised of split ball-joint gripping portions 18a and 18b. These support arm gripping portions straddle and grip the ball 36 of a ball-joint support member 38 which is appropriately affixed to the mounting plate 24. The ball-joint gripping portions 18a and 18b of the support arm 18 are loosened or compressed against the ball 36 of the ball-joint via thumb screw means 18c whereby the mounting device 16 can be rotated upwardly and downwardly and pivoted to obtain a proper orientation for the device and supported scope or camera. FIGS. 3 and 4 should also be referred to for a full understanding of the construction and function of the lower support arm 18 and its lower end pivoted relationship with the ball-joint support member affixed to the mounting plate 24.

Referring to FIGS. 2, 3 and 4 together, the upper support arm 20 of the mounting device 16 of the invention is pivotally attached to the lower support arm 18 via ball-joint interconnection. Such ball-joint interconnection is comprised of split ball-joint gripping portions 18d and 18e at the upper end of lower support arm 18 and a gripped ball 20a projecting from the lower end of the upper support arm 20 via ball attachment member 20b at the end of the support arm 20. The support arm gripping portions 18d and 18e straddle and grip the ball 20a. The ball-joint gripping portions 18d and 18e of the support arm 18 are loosened or compressed against the ball 20a of the support arm interconnecting ball-joint via thumb screw means 18f whereby the upper support arm 20 can be rotated upwardly and downwardly and pivoted to obtain a proper orientation of such arm with respect to the lower support arm 18 and thereby providing additional position adjustment to the supported spotting scope or camera.

The upper end of upper support arm 20 of the adjustable and collapsible support device 16 also terminates in disk-joint gripping portions 20c and 20d which are loosened or compressed by thumb screw means 20e against a lower disk 40b (visible in FIG. 2) which is part of the double pivot and rotational upper coupling mechanism 40. A top mounting plate 42 of support device 16 is provided for support, and screw means 42a for attachment, of either a spotting scope or camera. As shown in dashed outline in FIG. 3, it is a spotting scope 22 that is releasably positioned on, and affixed to (via screw means 42a), the top mounting plate 42 of the adjustable and collapsible support device 16 of the invention. The upper coupling mechanism 40 of the device 16 includes an upper cylindrical portion 40a interacting in rotational fashion with depending side portions 42b and 42c of the top mounting plate 42.

The top mounting plate 42, through the side portion 42c, has attached thereto a spotting scope or camera guide handle 44 with hand grip portion 44a. As seen in FIG. 4, through a cut-away portion of mounting plate 42 (and as seen in FIG. 3 through a cut-away portion of depending side portion 42b), the depending side portion 42c is bifurcated whereby such side portion can provide a clamping action to cylindrical portion 40a of the upper coupling mechanism 40 by a twisting action applied to the hand grip portion 44a of handle 44 and thereby secure the vertical positioning of the scope or camera. Thus, the threaded end 44b of handle 44 threadably engages a first bifurcated side of depending side portion 42c of mounting plate 42 (see FIG. 3) whereby, upon the twisting of the hand grip portion 44a, threaded end portion 44b of handle 44 pulls a pressure collar 44c of the handle 44 against a second bifurcated side of the depending side portion 42c to close the bifurcated portions of the side portion 42c and thereby securely grip the cylindrical portion 40a.

As previously indicated and as shown in FIG. 2, the base mounting plate 24 of the adjustable and collapsible camera and spotting scope support device 16 of the invention also bears an upwardly extending support bracket 26. The support bracket 26 includes an attached depending member 26a with an upper sling portion 26b which, as shown in FIG. 2, supports and inhibits movement of the spotting scope 22 when the support device 16 is in its collapsed non-operative position. The support bracket depending member 26a also includes a lower sling portion 26c which supports and inhibits movement of the collapsed (folded) support arms 18 and 20. The support bracket 26 is pivotally affixed (hinged) at its lower end to the base mounting plate 24 by means of a pair of "L" shaped brackets 46 the short legs of which may be welded to the upper surface of the plate 24. The support bracket 26 is held in its upright position by a locking pin 26d when the support device 16 is in its collapsed and non-operative position as shown in FIG. 2. The support bracket 26 may be unlocked from its upright orientation with respect to the base mounting plate 24 by removing the locking pin 26d to permit the folding down of the bracket 26 to mounting plate 24 (as shown in dashed outline in FIGS. 3 and 4) when the camera or spotting scope mounting device 16 of the invention is positioned in its upward operative position as shown in FIG. 1.

As shown in FIGS. 2 and 3, the lower support arm 18 bears a holding bracket 48 for receiving and holding the upper end of the upper support arm 20 and for maintaining the rotational upper coupling mechanism 40 and top mounting plate 42, with its attached camera or spotting scope, in a protected non-operative collapsed position.

Although the present invention has been fully described by way of a preferred embodiment thereof with reference to the accompanying drawing figures, various additions, changes and modifications will be apparent to those having skill in the field. Therefore, unless otherwise these changes and modifications depart from the scope of the present invention as set forth in the appended claims, they should be construed as included therein.

What is claimed is:

1. An extendable device mountable on a cargo rack of an all-terrain vehicle for supporting a camera or spotting scope and adjustable to secure said camera or spotting scope in a raised operative position above said rack or in a collapsed non-operative stored position proximate said rack, comprising:
   a) a base mounting plate having means to removably attach said base plate to said cargo rack;
   b) a lower support arm having a lower end and an upper end, said lower arm including first connector means for pivotally and rotatably mounting said lower arm at its lower end to said base plate;
   c) an upper support arm having a lower end and an upper end, said upper support arm including second connector means for pivotally and rotatably mounting said upper arm at its lower end to the upper end of said lower arm;
   d) a top mounting plate with screw means for attachment and support of either a camera or a spotting scope, said top plate including third connector means for pivotally mounting said top plate to the upper end of said upper support arm;
   e) means at each of said first and second connector means for loosening said first and second connector means to permit movement of said support arms upwardly to extend said device, with camera or spotting scope on said top mounting plate, to an operative position or to permit movement of said support arms downwardly in a folded collapsed form, with said camera or said spotting scope, to a non-operative position proximate said base mounting plate or for tightening said first and second connector means to hold said support arms and said top mounting plate in said operative position or to hold said support arms and said top mounting plate in said non-operative position proximate said base mounting plate, said base mounting plate having mounted thereon an upwardly extendable support bracket for holding said support arms when said arms are in their folded collapsed non-operative position proximate said base mounting plate; and
   f) means at said third connector means for loosening said third connector means to permit upward and downward rotational movement of said top mounting plate with said camera or spotting scope.

2. The extendable device mountable on a cargo rack of an all-terrain vehicle for supporting a camera or spotting scope as claimed in claim 1 wherein said first and second connector means are ball joints.

3. The extendable device mountable on a cargo rack of an all-terrain vehicle for supporting a camera or spotting scope as claimed in claim 1 wherein said third connector means for the top mounting plate includes downwardly depending side portions between which there is positioned a cylinder pivotally inter-connected to the upper end of said upper support arm, said cylinder being rotationally supported at its ends by said depending side portions of said top mounting plate, one of said depending side portions being bifurcated to releasably grip an end of said cylinder for the positioning thereof and thereby the attached top mounting plate and supported camera or spotting scope.

4. The extendable device mountable on a cargo rack of an all-terrain vehicles for supporting a camera or spotting scope as claimed in claim 3 wherein the bifurcated depending side portion of said top mounting plate has attached thereto handle means for aiming said camera or spotting scope, said handle means being rotatable to tighten or loosen the grip of said bifurcated side portion on the end of said cylinder.

5. The extendable device mountable on a cargo rack of an all-terrain vehicle for supporting a camera or spotting scope as claimed in claim 1 wherein said upwardly extendable support bracket is affixed by hinge means at its lower end to said base mounting plate whereby said support bracket may be folded downwardly to said base mounting plate when said extendable device is in said operative position.

6. The extendable device mountable on a cargo rack of an all-terrain vehicle for supporting a camera or spotting scope as claimed in claim 5 wherein said hinge means includes locking means to hold said upwardly extendable support bracket in an upwardly extended position when said extendable device is in said non-operative position.

7. An extendable device mountable on a cargo rack of an all-terrain vehicle for supporting a camera or spotting scope and adjustable to secure said camera or spotting scope in a raised operative position above said rack or in a collapsed non-operative stored position proximate said rack, comprising:
   a) a base mounting plate having means to removably attache said base plate to said cargos rack;
   b) a lower support arm having a lower end and an upper end, said lower arm pivotally and rotatably mounted via a ball joint at its lower end to said base mounting plate;
   c) an upper support arm having a lower end and an upper end, said upper support arm pivotally and rotatably mounted via a ball joint at its lower end to the upper end of said lower arm;
   d) a top mounting plate with screw means for attachment and support of either a camera or a spotting scope, said top mounting plate including pivotal means for mounting said top mounting plate to the upper end of said upper support arm; and
   f) means at each of said ball joints and said pivotal means for loosening said ball joints and pivotal means to permit movement of said support arms upwardly to extend said device, with said camera or said spotting scope on said top mounting plate, to an operative position or to permit movement of said support arms downwardly in a folded collapsed form, with said camera or said spotting scope on said top mounting plate, to a non-operative position proximate said base mounting plate or for tightening said ball joints and pivotal means to hold said support arms and said top mounting plate in said operative position or to hold said support arms and said top in said non-operative position proximate said base mounting plate, said base mounting plate having mounted thereon an upwardly extendable support bracket for holding said support arms when said arms are in their folded collapsed non-operative position proximate said base mounting plate.

8. The extendable device mountable on a cargo rack of an all-terrain vehicle for supporting a camera or spotting scope as claimed in claim 7 wherein said means at each of said ball joints and said pivotal means for loosening said ball joints and pivotal means and for tightening said ball joints and pivotal means are thumb screw means.

* * * * *